United States Patent [19]

Tanaka et al.

[11] Patent Number: 5,115,177
[45] Date of Patent: May 19, 1992

[54] MALFUNCTION DIAGNOSIS METHOD

[75] Inventors: Kunio Tanaka, Akishima; Kosuke Chiba, Yamanashi, both of Japan

[73] Assignee: Fanuc Ltd., Yamanashi, Japan

[21] Appl. No.: 469,462

[22] PCT Filed: Aug. 16, 1989

[86] PCT No.: PCT/JP89/00836
§ 371 Date: Apr. 2, 1990
§ 102(e) Date: Apr. 2, 1990

[87] PCT Pub. No.: WO90/02364
PCT Pub. Date: Mar. 8, 1990

[30] Foreign Application Priority Data
Aug. 26, 1988 [JP] Japan .................. 63-211956

[51] Int. Cl.⁵ .................... G05B 9/02
[52] U.S. Cl. .................. 318/568.1; 318/568.11;
364/269.4; 371/16.1; 371/22.1; 371/5.1; 371/10.1
[58] Field of Search ............... 318/560-646;
364/474.19, 474.11, 550, 477, 269.4; 371/2.1, 3,
5.1, 10.1, 10.3, 9.1, 15.1, 19, 21.1, 21.2, 21.6,
223, 22.4, 22.1, 22.5, 22.6, 23, 25.1, 26, 27, 29.1

[56] References Cited

U.S. PATENT DOCUMENTS

| | | | |
|---|---|---|---|
| 3,544,777 | 12/1970 | Winkler | 371/10.1 |
| 4,181,940 | 1/1980 | Underwood et al. | 364/200 |
| 4,412,281 | 10/1983 | Works | 371/9.1 X |
| 4,456,996 | 6/1984 | Haas et al. | 371/5.1 X |
| 4,618,954 | 10/1986 | Otobe et al. | 371/5.1 X |
| 4,691,316 | 9/1987 | Philips | 371/22.1 X |
| 4,736,376 | 4/1988 | Stiffler | 371/3 X |
| 4,829,520 | 5/1989 | Toth | 371/22.1 |
| 4,872,166 | 10/1989 | Jippo | 371/10.1 X |
| 4,876,684 | 10/1989 | Guntheroth | 371/21.2 |
| 4,912,711 | 3/1990 | Shiramizu | 371/16.1 |
| 4,942,513 | 7/1990 | Sakuno et al. | 371/29.1 X |
| 4,953,165 | 8/1990 | Jackson | 371/16.1 |
| 4,967,347 | 10/1990 | Smith et al. | 371/16.1 X |
| 4,975,950 | 12/1990 | Lentz | 364/269.4 X |

FOREIGN PATENT DOCUMENTS

| | | |
|---|---|---|
| 58-147264 | 9/1983 | Japan . |
| 59-44105 | 3/1984 | Japan . |
| 61-148941 | 7/1986 | Japan . |
| 62-190951 | 8/1987 | Japan . |
| 63-250953 | 10/1988 | Japan . |
| 63-250954 | 10/1988 | Japan . |

Primary Examiner—Paul Ip
Attorney, Agent, or Firm—Staas & Halsey

[57] ABSTRACT

Disclosed is a malfunction diagnosis system used for the diagnosis of a malfunction of a numerical control system (CNC) having a programmable controller (PC) by a remote host computer. A host computer (4) reads input and output signals of a programmable controller (PC), diagnoses the malfunction, and repairs the malfunction by processing the input and output signals, whereby the malfunctions can be repaired by a remote control operation.

3 Claims, 1 Drawing Sheet

MALFUNCTION DIAGNOSIS METHOD

TECHNICAL FIELD

The present invention relates to a malfunction diagnosis system for use in the diagnosis of a malfunction of a numerical control system (CNC) by a remote host computer, and more specifically, to a malfunction diagnosis method and system capable of processing input and output signals and the like of the host computer.

BACKGROUND ART

Numerical control apparatuses (CNC) or programmable controllers connected thereto (PC) have become more sophisticated and complicated due to advances in a semiconductor technology including a microprocessor and a software technology. The malfunction rate of these numerical control apparatuses and programmable controllers has been reduced to a very low level by improvements in reliability technologies, but once a malfunction occurs, it is sometimes difficult to find the portion at which the malfunction exists. More specifically, an overall knowledge of electronics, software, machine tools, machining technologies and the like is required to find the malfunctioning portion.

A malfunction diagnosis system has been proposed wherein a host computer is installed at a service station and a malfunction of a CNC system is diagnosed by connecting the host computer to the CNC system through a communication line instead of dispatching a service engineer to the site at which the CNC system is installed, to diagnose the malfunction.

Nevertheless, even if the portion of the CNC system at which a malfunction has occurred is found as a result of the malfunction diagnosis effected by the host computer connected to the CNC system, a service engineer must be dispatched to the field to repair the malfunction, and it is not always possible to meet the user's request for an immediate dispatch of a service engineer.

On the other hand, as a result of the diagnosis, it is often found that the CNC system is suffering only a local malfunction, and can be returned to use by a suitable processing of the malfunction. Further, it is sometimes found that the CNC system itself has malfunctioned and it is a sequence program or the like that is defective. Therefore, there are many cases wherein a machining operation can be resumed by taking suitable measures, without the need for a service engineer at the site.

SUMMARY OF THE INVENTION

Taking the above into consideration, an object of the present invention is to provide a malfunction diagnosis system capable of processing input and output signals and the like of a host computer.

To solve the above problem, in accordance with the present invention, there is provided a malfunction diagnosis system for use in the diagnosis of a malfunction of a numerical control system (CNC) having a programmable controller (PC) by a remote host computer, comprising the steps of reading input and output signals of the PC by the host computer, diagnosing the malfunction to determine whether the malfunction can be repaired by processing the input and output signals, and repairing the malfunction by processing the input and output signals.

An service engineer operates the host computer and reads the input and output signals from the PC connected to the host computer through a communication line, and diagnoses a cause of the malfunction from the input and output signals.

When a local malfunction occurs and the CNC system can be used by restricting a part of the functions thereof, a part of the input and output signals is peremptorily changed to enable the CNC system to be operated.

DESCRIPTION OF THE PREFERRED EMBODIMENT

An embodiment of the present invention will be described below with reference to drawings.

Figure 1:
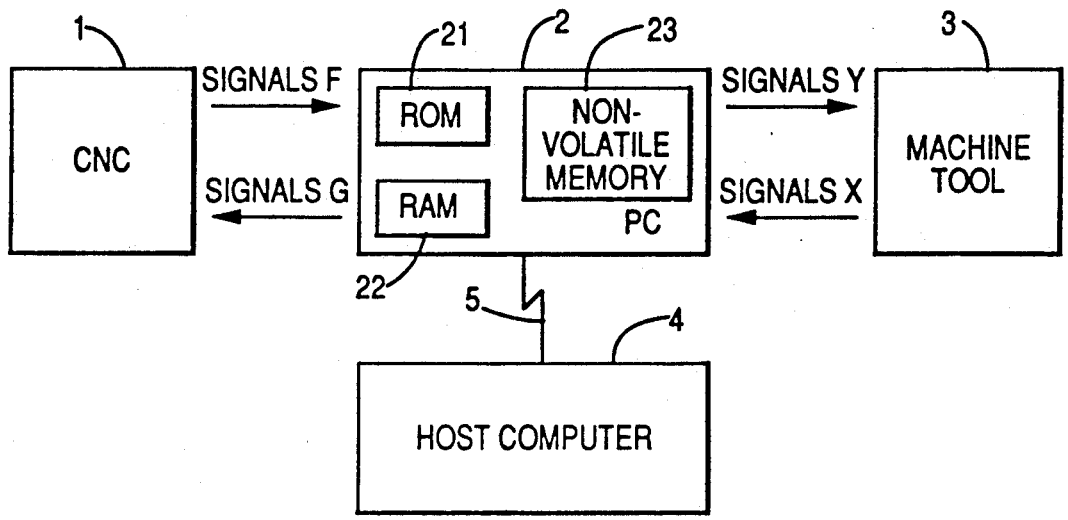
FIG. 1 is a conceptual diagram of a malfunction diagnosis system according to the present invention.

FIG. 1 illustrates a malfunction diagnosis system according to the present invention, wherein 1 designates a numerical control system (hereinafter, referred to as a CNC) and 2 designates a programmable controller (hereinafter, referred to as a PC), which is a programmable machine controller (PMC) contained in the CNC 1 or a programmable logic controller (PLC) provided independently of the CNC 1. The PC 2 is provided with a ROM 21 in which a sequence program and a management program for managing the execution of the sequence program are stored, a RAM 22 in which input and output signals and the like are stored, and a non-volatile memory 23 in which parameters which must be maintained after a power supply is cut are stored. Sometimes, the sequence program is stored in the RAM 22 to operate the system in such a manner that a part of the sequence program can be changed in response to an instruction from a host computer. In FIG. 1, 3 designates a machine tool and 4 designates the host computer installed at a service center and connected to the PC 2 through a communication line 5. Preferably the communication line is a public communication line of about 2400 bits/sec to 9600 bits/sec, or a high speed digital transmission line of 64 kbits/sec or more when image data or the like is transmitted at a high speed.

The CNC 1 outputs machine control signals F such as M, S, and T functions and the like, and the PC 2 output signals Y to the machine tool 3 to control actuators and the like thereof in response to the signals F.

On the contrary, the machine tool 3 outputs signals X of switches and the like, indicating the statuses thereof to the PC 2, and the PC 2 controls the machine tool 3 based on these signals. Further, a part of the signals is directly transmitted to the CNC, or transmitted thereto after having been processed by the sequence program in the PC 2, as signals G.

Therefore, it is generally possible to diagnose a portion of the CNC system at which a malfunction has occurred by examining these input and output signals F, Y, X, and G. On the other hand, when a malfunction of the switches of the machine tool 3 occurs, the system is arranged such that the PC 2 produces an alarm and the operation of the machine tool 3 is interrupted. The malfunction of the switches or the like is rarely related to an overall machining operation, however, and thus when the malfunction is not related to the overall machining operation, the parts of the machining operation not affected by the malfunction can be continued.

Therefore, when this kind of malfunction occurs, preferably the CNC system operation is continued by tentatively processing a malfunctioned portion thereof, as long as this does not affect the safety of the operation. Similarly, even if a malfunction of a part of the functions of the CNC 1 has occurred, preferably the operation of the CNC system is continued if the malfunctioned part is not necessary to the current machining.

Therefore, when the malfunctioning portion is found, an instruction for peremptorily ignoring the status of the signals causing the malfunction is transmitted from the host computer and stored in the non-volatile memory 23 in the PC 2, to operate the CNC system.

Further, a malfunction is sometimes caused by an error in the sequence program, and in this case, the CNC system can be operated by correcting a part of the sequence program by an instruction from the host computer 4. To accomplish this, the CNC system must be operated with the sequence program stored in the RAM 22.

Figure 2:
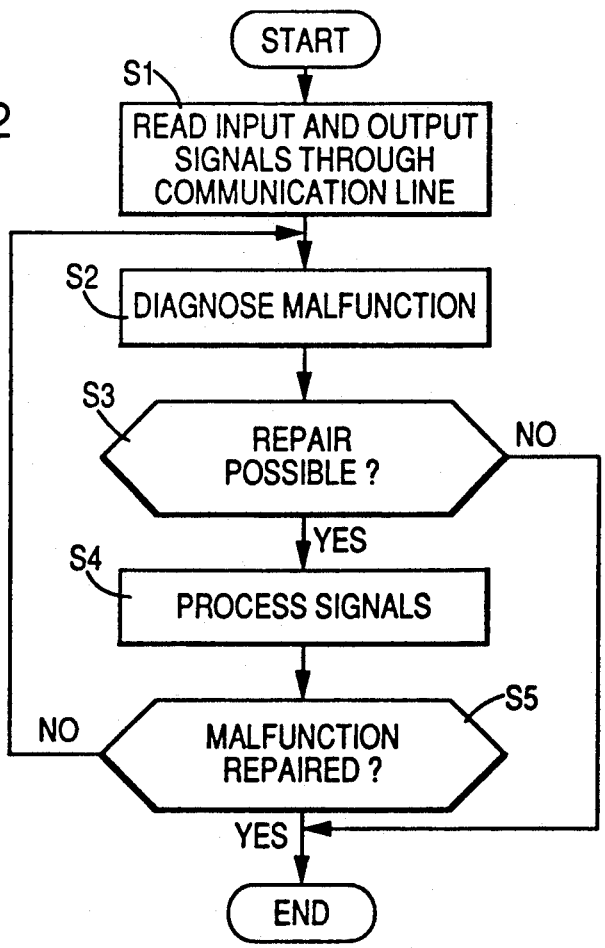
FIG. 2 is a flowchart of the processing effected by a host computer.

FIG. 2 shows a flowchart of a processing effected by the host computer, wherein numerals prefixed with an "S" indicate the numbers of steps of the process.

At step 1, a service engineer at a service station reads input and output signals through the communication line 5, using the host computer. In this case, data shown on a display and indicating the status of signals of the PC 2 can be directly transmitted as video signals. At step S2, the service engineer diagnoses a malfunction based on the input and output signals and the content thereof, to determine the cause of the malfunction, and when the cause is found, at step 3 it is determined whether the malfunction can be repaired based on an instruction from the host computer 4. When the malfunction can be repaired, the flow goes to step S4, and when it cannot be repaired, the service engineer goes to the site at which the CNC system is installed, and the operation of the CNC system is stopped until the service engineer arrives. At step S4, the input and output signals are processed. For example, when the signals X from the machine tool 3 are defective, the signals are cut off and other signals are tentatively stored in the non-volatile memory 23 and read by the sequence program. When the signals F from the CNC 1 are defective, the same process is executed.

Further, when the sequence program is defective, the sequence program is partly corrected. The corrected part is stored in the non-volatile memory 23, and corrected when a power supply is switched on and the sequence program is transmitted from the ROM 21 to the RAM 22.

Then, at step S5, it is determined whether the malfunction has been repaired, and when the malfunction has not been repaired, the flow returns to step S2 and the diagnosis of the malfunction is continued.

The temporarily repaired portion will be permanently repaired by a service engineer later, and down time of the CNC can be minimized and the workload of the service engineer reduced.

As described above, according to the present invention, since signals and the like causing a malfunction can be changed by the host computer, the malfunction can be repaired by a remote control operation, and the time necessary to repair the malfunction is reduced, whereby the operation rate of the CNC system is improved and the workload of the service engineer is reduced.

We claim:

1. A malfunction diagnosis method for diagnosing a malfunction of a numerical control system (CNC) having a programmable controller (PC) including a non-volatile memory, using a remote host computer, comprising the steps of:
   (a) reading input and output signals of said PC by said remote host computer;
   (b) diagnosing said malfunction to determine whether said malfunction can be repaired by providing an instruction from said remote host computer;
   (c) storing correct processing signals in response to the instruction and when said malfunction can be repaired;
   (d) repairing said malfunction by ignoring said input and output signals caused by said malfunction and storing corrected processing signals in said non-volatile memory; and
   (e) automatically executing the sequence program by providing the corrected processing signals from said non-volatile memory to control the numerical control system.

2. A malfunction diagnosis method according to claim 1, further comprising the step of:
   providing an instruction from said host computer to initiate the storing of corrected processing steps.

3. A malfunction diagnosis method according to claim 1, wherein said PC is a programmable machine controller contained in said CNC.

* * * * *